United States Patent
Luke et al.

(10) Patent No.: US 8,213,999 B2
(45) Date of Patent: Jul. 3, 2012

(54) CONTROLLING METHOD AND SYSTEM FOR HANDHELD COMMUNICATION DEVICE AND RECORDING MEDIUM USING THE SAME

(75) Inventors: Hok-Sum Horace Luke, Taoyuan County (TW); Chih-Hua Wang, Taoyuan County (TW); Ying-Huang Wu, Taoyuan County (TW); Yi-Lin Chen, Taoyuan County (TW); Hsiang-Yuan Peng, Taoyuan County (TW); Yuan-Mao Tsui, Taoyuan County (TW); Cheng-Hao Chin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 603 days.

(21) Appl. No.: 12/346,770

(22) Filed: Dec. 30, 2008

(65) Prior Publication Data

US 2009/0137286 A1    May 28, 2009

Related U.S. Application Data

(63) Continuation-in-part of application No. 12/146,455, filed on Jun. 26, 2008, now Pat. No. 8,117,471.

(30) Foreign Application Priority Data

Nov. 27, 2007   (TW) ............................... 96144990 A

(51) Int. Cl.
  *H04M 1/00* (2006.01)
  *H04B 1/38* (2006.01)
(52) U.S. Cl. ....... 455/574; 455/418; 455/567; 455/90.1; 455/230

(58) Field of Classification Search .................. 455/574, 455/567, 414.1, 414.2, 414.4, 418
See application file for complete search history.

(56) References Cited

U.S. PATENT DOCUMENTS

| | | | |
|---|---|---|---|
| 6,408,178 B1 | 6/2002 | Wickstrom et al. | |
| 2002/0021278 A1* | 2/2002 | Hinckley et al. | 345/156 |
| 2004/0127198 A1* | 7/2004 | Roskind et al. | 455/412.2 |
| 2004/0133817 A1* | 7/2004 | Choi | 713/300 |
| 2004/0259536 A1* | 12/2004 | Keskar et al. | 455/418 |

(Continued)

FOREIGN PATENT DOCUMENTS

CN        1372752 A        10/2002

(Continued)

OTHER PUBLICATIONS

"Partial Search Report of European counterpart application", issued on Sep. 17, 2009, p. 1-p. 5.

(Continued)

*Primary Examiner* — Duc M Nguyen
(74) *Attorney, Agent, or Firm* — Jianq Chyun IP Office

(57) ABSTRACT

A controlling method and a controlling system for a handheld communication device are provided. In the present method, a tilting state of the handheld communication device is detected by using a G-sensor when a notice is activated. Then, whether the tilting state is changed from a face up state to a face down state is determined. The handheld communication device is controlled to perform a function when the tilting state is confirmed to be changed from the face up state to the face down state. Accordingly, the handheld communication device may be controlled to perform a function timely according to the positioned state of the device without going through complicated procedures, so as to provide a more intuitive and convenient way to control the handheld communication device.

14 Claims, 6 Drawing Sheets

U.S. PATENT DOCUMENTS

2006/0240866 A1* 10/2006 Eilts ............................ 455/556.1
2007/0004451 A1* 1/2007 Anderson ................... 455/556.1
2009/0138736 A1* 5/2009 Chin ............................. 713/320
2010/0159998 A1* 6/2010 Luke et al. .................... 455/567

FOREIGN PATENT DOCUMENTS

| CN | 1744616 A | 3/2006 |
| WO | 2006057770 | 6/2006 |
| WO | 2008075082 | 6/2008 |

OTHER PUBLICATIONS

"First Office Action of China Counterpart Application", issued on Dec. 23, 2011, p. 1-p. 5.

* cited by examiner (a)

(b)

(c)

(d)

CONTROLLING METHOD AND SYSTEM FOR HANDHELD COMMUNICATION DEVICE AND RECORDING MEDIUM USING THE SAME

CROSS-REFERENCE TO RELATED APPLICATION

This application is a continuation-in-part of U.S. application Ser. No. 12/146,455, filed on Jun. 26, 2008, all disclosures is incorporated therewith. The prior application Ser. No. 12/146,455 claims the priority benefit of Taiwan application serial no. 96144990, filed on Nov. 27, 2007. The entirety of each of the above-mentioned patent applications is hereby incorporated by reference herein and made a part of this specification.

BACKGROUND OF THE APPLICATION

1. Field of the Application

The present application relates to a controlling method and a controlling system, and in particular, to a controlling method and a controlling system for a handheld communication device using a G-sensor.

2. Description of Related Art

Along with the continuous development of the technology, handheld communication devices such as a mobile phone, or a personal digital assistant (PDA) phone have integrated a greater number of functions. Besides functions such as making calls, sending/receiving messages, and making notes, surfing the Internet and receiving/sending e-mails also have become basic functions of the handheld communication devices in the current market. Multiple functions not only can facilitate people's life but also can provide entertainments, and thus the handheld communication devices have become one of the most popular high-tech electronic products in the current market.

A user is able to use the handheld communication device to receive and make calls. In a normal mode of the handheld communication device, when receiving an incoming call, the handheld communication usually reminds the user to pick up the phone through a ringing and/or a vibration fashion. However, it is happened that in situations of attending a meeting or a lecture, the handheld communication device usually bursts out ringing when receiving an incoming call and the user can only embarrassingly hand up the call or switch the handheld communication device into a mute mode, which is quite inconvenient.

SUMMARY OF THE APPLICATION

In light of the above, the present application provides a controlling method and a controlling system for a handheld communication device, in which a G-sensor is used for detecting a tilting state of the handheld communication device, so as to determine whether to perform a function of the handheld communication device when a notice is activated.

In order to achieve the above-mentioned or other objects, the present application provides a controlling method for a handheld communication device. First, a tilting state of the handheld communication device is detected by using a G-sensor. Then, whether the tilting state is changed from a face up state to a face down state is determined. The handheld communication device is controlled to perform a function when the tilting state is confirmed to be changed from the face up state to the face down state.

According to an embodiment of the present application, the step of detecting the tilting state of the handheld communication device comprises detecting the tilting state of the handheld communication device when a notice is activated.

According to an embodiment of the present application, the step of controlling the handheld communication device to perform the function comprises controlling the handheld communication device to enter a mute mode when the tilting state is confirmed to be changed from the face up state to the face down state.

According to an embodiment of the present application; the handheld communication device is controlled to enter the mute mode during the time period of the notice and is controlled to return to a normal mode when the notice is terminated.

According to an embodiment of the present application, the notice comprises a sound notice, wherein a sound of the handheld communication device is turned on in the normal mode and turned off in the mute mode.

According to an embodiment of the present application, the notice comprises a sound notice, wherein a sound of the handheld communication device is turned on in the normal mode and turned off in the mute mode.

According to an embodiment of the present application, the notice comprises a ringtone notice, wherein a ringtone of the handheld communication device is turned on in the normal mode and turned off in the mute mode.

According to an embodiment of the present application, the notice comprises a vibration notice, wherein a vibration function of the handheld communication device is turned on in the normal mode and is turned off in the mute mode.

According to an embodiment of the present application, the step of detecting the tilting state of the handheld communication device comprises detecting the tilting state of the handheld communication device at a fixed interval, in which a length of the fixed interval is between 50 and 200 milliseconds.

According to an embodiment of the present application, the step of determining whether the tilting state is changed from the face up state to the face down state comprises following steps. First, whether the tilting state is in the face up state is determined. Next, it is continued to determine whether the tilting state is changed to the face down state when the tilting state is determined in the face up state. Then, whether a number of times that the tilting state is continuously determined in the face down state exceeds a preset value is determined when the tilting state is determined to be changed to the face down state. Finally, it is confirmed that the tilting state is changed from the face up state to the face down state when the number of times exceeds the preset value.

According to an embodiment of the present application, in the step of determining whether the number of times that the tilting state is continuously determined in the face down state exceeds a preset value, if the number of times has not exceeded the preset value and the tilting state is changed from the face down state to the tilting state other than the face down state, whether the tilting state is changed from the face up state to the face down state is re-determined.

According to an embodiment of the present application, in the step of detecting the tilting state of the handheld communication device by using the G-sensor, a normal vector of a plane of the handheld communication device is detected first. Then, a tiling angle that the plane is rotated along a transverse coordinate axis (X axis) and a rolling angle that the plane is rotated along a vertical coordinate axis (Y axis) are calculated according to the detected normal vector and compared with a plurality of angle ranges corresponding to a plurality of tilting states, so to determine the current tilting state of the handheld communication device.

According to an embodiment of the present application, the angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree.

According to an embodiment of the present application, the angle range of the tiling angle corresponding to the face down state is from 170 degree to 190 degree and the angle range of the rolling angle corresponding to the face down state is from 170 degree to 190 degree.

According to an embodiment of the present application, the plane of the handheld communication device is the plane comprising a screen of the handheld communication device.

According to an embodiment of the present application, the tilting state comprises landscape left state, landscape right state, portrait top state, portrait bottom state, face up state, and face down state.

The present application provides a controlling system comprising a G-sensor and a tilting state determining module, in which the G-sensor is used for detecting a tilting state of a handheld communication device and the tilting state determining module is used for determining whether the tilting state is changed from a face up state to a face down state and controlling the handheld communication device to perform a function when the tilting state is confirmed to be changed from the face up state to the face down state.

According to an embodiment of the present application, the G-sensor detects the tilting state of the handheld communication device when a notice is activated, and the tilting state determining module controls the handheld communication device to enter a mute mode when the tilting state is confirmed to be changed from the face up state to the face down state.

According to an embodiment of the present application, the tilting state determining module controls the handheld communication device to enter the mute mode during the time period of the notice and return to a normal mode when the notice is terminated.

According to an embodiment of the present application, the G-sensor comprises detecting the tilting state of the handheld communication device at a fixed interval.

According to an embodiment of the present application, the tilting state determining module comprises determining whether the tilting state is in the face up state, continuing to determine whether the tilting state is changed to the face down state when the tilting state is determined in the face up state, determining whether a number of times that the tilting state is continuously determined in the face down state exceeds a preset value when the tilting state is determined to be changed to the face down state, and confirming that the tilting state is changed from the face up state to the face down state when the number of times exceeds the preset value.

According to an embodiment of the present application, the G-sensor comprises detecting a normal vector of a plane of the handheld communication device, calculating a tiling angle that the plane is rotated along a transverse coordinate axis (X axis) and a rolling angle that the plane is rotated along a vertical coordinate axis (Y axis) according to the detected normal vector, and comparing the tiling angle and the rolling angle with a plurality of angle ranges corresponding to a plurality of tilting states to determine the current tilting state of the handheld communication device, wherein the angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree, and the angle range of the tiling angle corresponding to the face down state is from 170 degree to 190 degree and the angle range of the rolling angle corresponding to the face down state is from 170 degree to 190 degree.

The present application provides a recording medium, for recording a computer program, wherein the computer program comprises a plurality of program codes, and the computer program is suitable for being loaded into a handheld communication device to enable the handheld communication device to execute a controlling method, and the controlling method comprises following steps. First, a tilting state of the handheld communication device is detected. Then, whether the tilting state is changed from a face up state to a face down state is determined and the handheld communication device is controlled to perform a function when the tilting state is confirmed to be changed from the face up state to the face down state.

In the present application, a G-sensor is used to detect the tilting state of the handheld communication device, in which the tilting state comprises landscape left state, landscape right state, portrait top state, portrait bottom state, face up state, and face down state, and each of which has a corresponding angle range. If it is determined that the tilting state of the handheld communication is changed from the face up state to the face down state, the handheld communication device is controlled to perform a function without going through complicated operating procedures, and thereby a more intuitive and convenient way to control the handheld communication device is provided.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF EMBODIMENTS

Usually, when an user operates a handheld communication device equipped with a screen, such as a vertical type (bar type) device or a glide-open type (sliding type) device, he/she often places the front plane (i.e. the plane having the screen) of the device upwards. If the device is a flip-open type (clam shell type) device, the user may also place an upper lid having the screen upwards or inclined upwardly when the device is in use. However, in some situations such as in a meeting or in a lecture, when receiving an incoming call, a user may be improper to pick it up and need to hand up the phone or mute the device instantly. At this very moment, a most intuitive way is to flip the device and let the front plane face toward the downward direction, such that the present application provides a controlling method and a controlling system for a handheld communication device and a recording medium using the same based on the above-mentioned concept. In order to make the present application more comprehensible, embodiments are described below as the examples to prove that the application can actually be realized.

Figure 1:
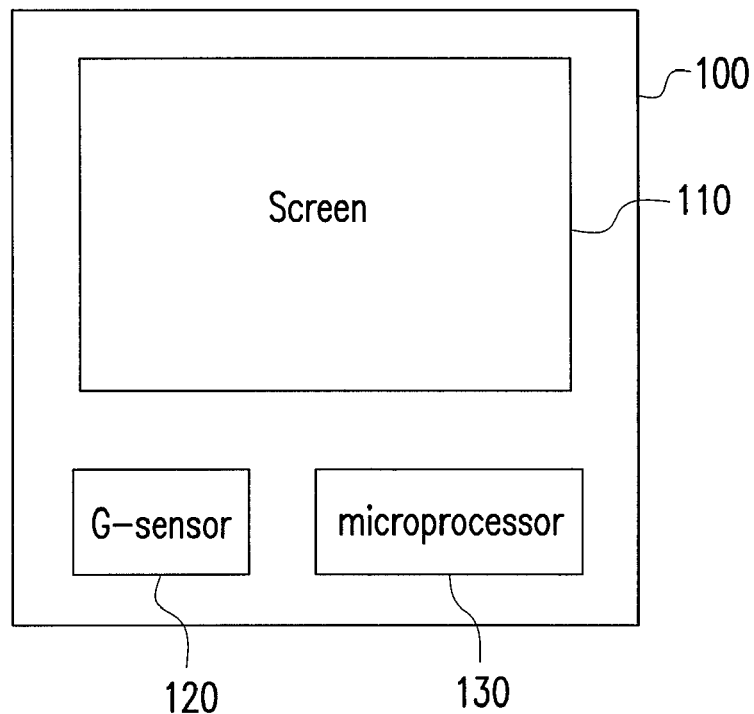
FIG. 1 is a block diagram of a handheld communication device according to one embodiment of the present application.

FIG. 1 is a block diagram of a handheld communication device according to one embodiment of the present application. Referring to FIG. 1, the handheld communication device 100 of the present application comprises a screen 110, a G-sensor 120, and a microprocessor 130. The handheld communication device 100 comprises, for example, a mobile phone, a smartphone, a touch phone, a PDA phone, or an ultra-mobile PC (UMPC), and the types of the handheld communication device 100 has no limitation.

According to the embodiment of the present application, the G-sensor 120 is disposed in the handheld communication device 100 for detecting a tilting state of the handheld communication device 100. To be specific, the G-sensor 120 is used to detect a normal vector of a plane of the handheld communication device 100 and calculate a tiling angle that the plane is rotated along a transverse coordinate axis (X axis) and a rolling angle that the plane is rotated along a vertical coordinate axis (Y axis) according to the detected normal vector. The aforesaid plane comprises, for example, the screen 110 of the handheld communication device 100 when the handheld communication device 100 is laid horizontally, or the plane comprises an upper lid having the screen of the handheld communication device 100 when a flip-open type handheld communication device 100 is in use.

The calculated tiling angle and rolling angle are then transmitted to microprocessor 130 for analyzing, so as to determine the current tilting state of the handheld communication device 100. In detail, the operating system 140 compares the calculated tiling angle and rolling angle with a plurality of angle ranges corresponding to a plurality of tilting states, so to determine whether the handheld communication device 100 should perform a function such as entering a mute mode.

Figure 2:
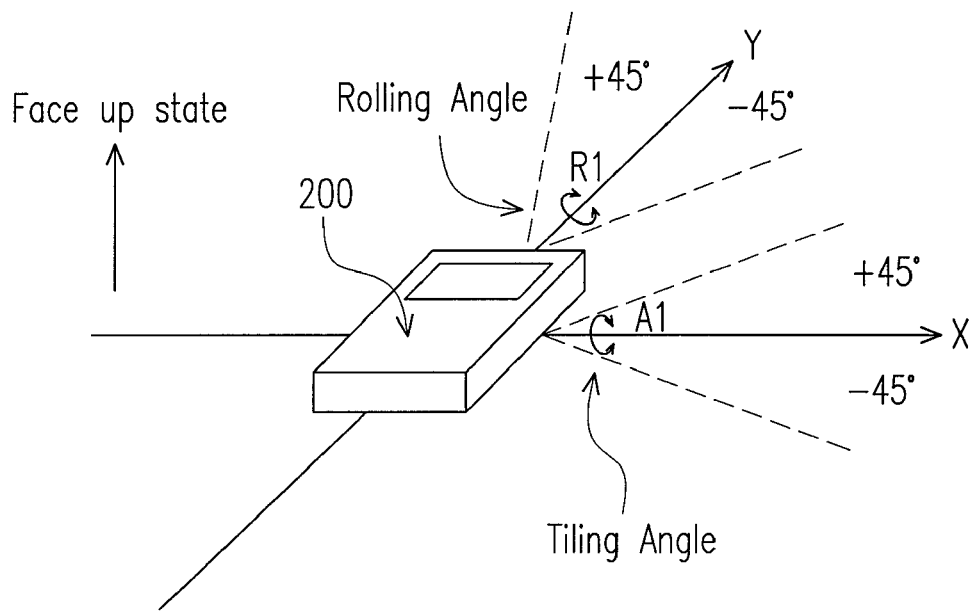
FIG. 2 is a schematic view illustrating a handheld communication device placed in a face up state according to one embodiment of the present application.

FIG. 2 is a schematic view illustrating a handheld communication device placed in a face up state according to one embodiment of the present application. Referring to FIG. 2, a front plane 200 of the handheld communication device is placed upwards, in which the front plane 200 is a plane having the screen. The tiling angle is defined as the angle A1 that the plane is rotated along a transverse coordinate axis (X axis) and the rolling angle is defined as the angle R1 that the plane is rotated along a vertical coordinate axis (Y axis). Moreover, the angle range of the tiling angle corresponding to the face up state is defined as from 0 degree to 45 degree and from 315 degree to 360 degree and the angle range of the rolling angle corresponding to the face up state is defined as from 0 degree to 45 degree and from 315 degree to 360 degree.

Figure 3:
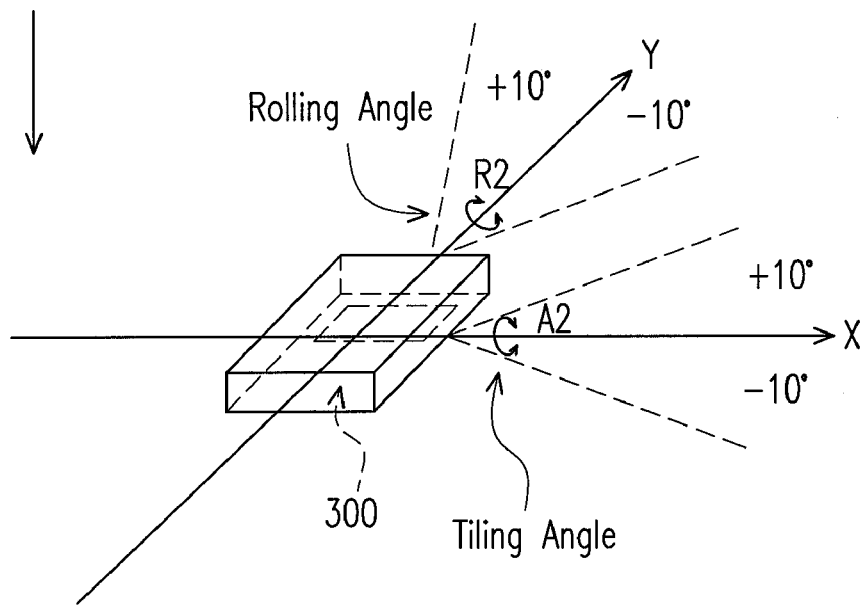
FIG. 3 is a schematic view illustrating a handheld communication device placed in a face down state according to one embodiment of the present application.

FIG. 3 is a schematic view illustrating a handheld communication device placed in a face down state according to one embodiment of the present application. Referring to FIG. 3, a front plane 300 of the handheld communication device is placed downwards, in which the front plane 300 is a plane having the screen. The tiling angle is defined as the angle A2 that the plane is rotated along a transverse coordinate axis (X axis) and the rolling angle is defined as the angle R2 that the plane is rotated along a vertical coordinate axis (Y axis). Moreover, the angle range of the tiling angle corresponding to the face down state is from 170 degree to 190 degree and the angle range of the rolling angle corresponding to the face down state is from 170 degree to 190 degree.

Figure 4:
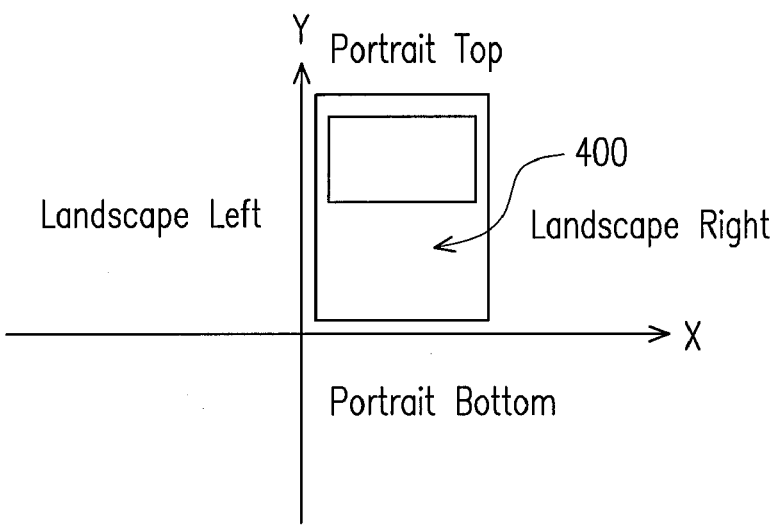
FIG. 4 is a schematic diagram illustrating the tilting states of a handheld communication device according to one embodiment of the present application.

It should be noted herein that besides the face up state and the face down state as defined above, the present application further classifies the tilting state of the handheld communication device 100 into a landscape left state, a landscape right state, a portrait top state, a portrait bottom state and also corresponds the rest angle ranges of the tiling angle and the rolling angle to those tilting states. FIG. 4 is a schematic diagram illustrating the tilting states of a handheld communication device according to one embodiment of the present application. Referring to FIG. 4, when the plane 400 of the handheld communication device is tilted to the left of the vertical axis (Y axis), then the tilting state of the handheld communication device is determined to be the landscape left state. When the plane 400 of the handheld communication device is tilted to the right of the vertical axis (Y axis), then the tilting state of the handheld communication device is determined to be the landscape right state. When the plane 400 of the handheld communication device is tilted to the top of the transverse axis (X axis), then the tilting state of the handheld communication device is determined to be the portrait top state. When the plane 400 of the handheld communication device is tilted to the bottom of the transverse axis (X axis), then the tilting state of the handheld communication device is determined to be the portrait bottom state.

Based on the above, when the operating system 140 determines that the tilting state of the handheld communication device 100 is changed from the face up state to the face down state, it then switches the handheld communication device 100 in to a mute mode, so as to prevent from interrupting or bothering the proceeding of a meeting or a lecture. Another embodiment is exemplified hereinafter to describe the detailed steps of the controlling method for the handheld communication device 100.

Figure 5:
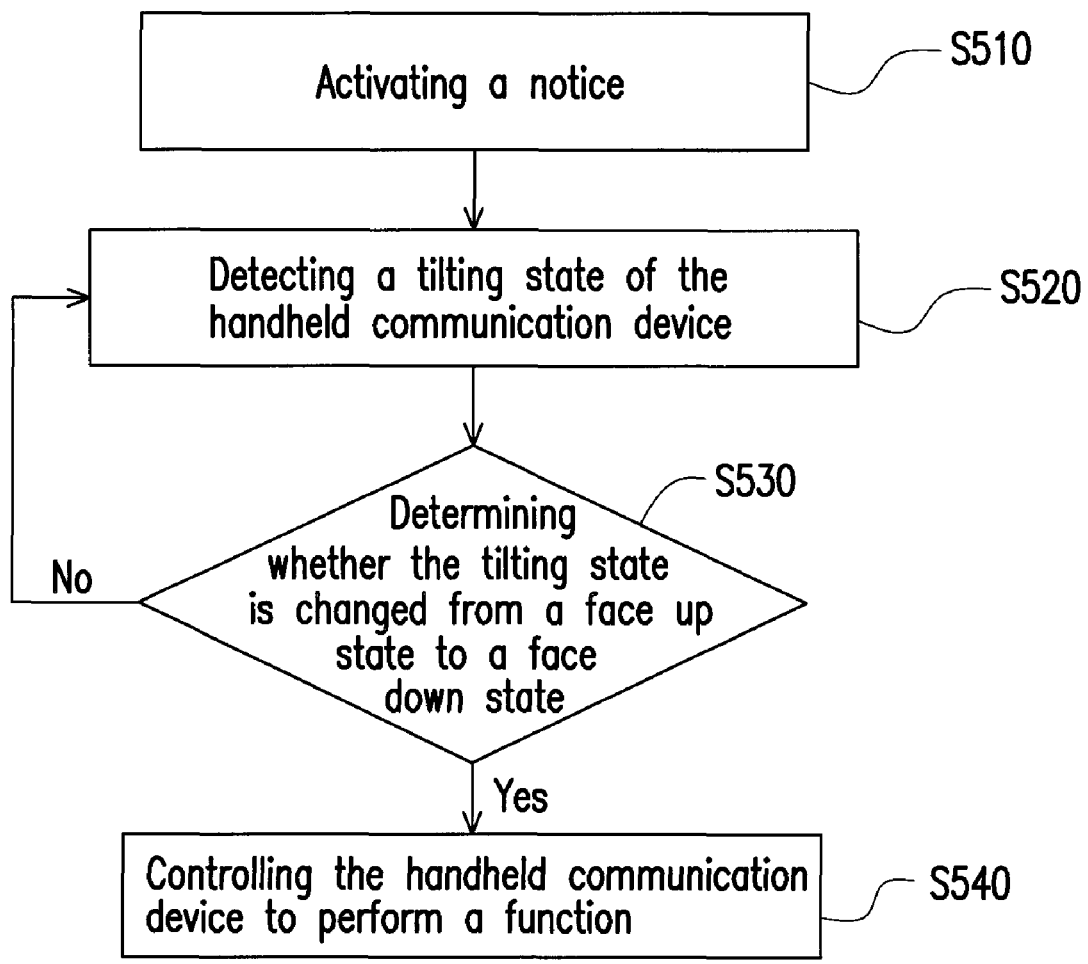
FIG. 5 is a flowchart illustrating a controlling method for a handheld communication device according to one embodiment of the present application.

FIG. 5 is a flowchart illustrating a controlling method for a handheld communication device according to one embodiment of the present application. Referring to FIG. 5, the present embodiment may be applied to the handheld communication device of the above-mentioned embodiments in order to control the handheld communication device to enter a mute mode timely when the front plane of the handheld communication device or the upper lid having the screen is determined as being directed from the upward to the downward direction. The steps of the present embodiment are as follows:

In a step S510, the handheld communication device activates a notice, for example, to remind the user of the alarm time or the appointment or event in the electronic calendar, or to inform the user of receiving an incoming call, a message, an e-mail and so on. According to the setting of a user, the notice may be a sound notice, a ringing notice and/or a vibration notice.

In a step S520, a G-sensor disposed in the handheld communication device is used for detecting the tilting state of the handheld communication device. In detail, the G-sensor can detect a normal vector of a plane of the handheld communication device and calculates a tiling angle and a rolling angle according to the detected normal vector, where the plane (as the plane 200 shown in FIG. 2) comprises the screen of the handheld communication device when the handheld communication device is laid horizontally. Then, according to the detected normal vector, the handheld communication device calculates a tiling angle that the plane is rotated along a transverse coordinate axis (X axis) and a rolling angle that the plane is rotated along a vertical coordinate axis (Y axis) according to the detected normal vector. Finally, the handheld communication device compares the calculated tiling angle and the rolling angle with a plurality of angle ranges corresponding to a plurality of tilting states so as to determine the current tilting state of the handheld communication device.

In a step S530, the handheld communication device determines whether the tilting state thereof is changed from a face up state to a face down state according to the calculated tiling angle and rolling angle. That is to say the calculated tiling angle and rolling angle is changed from within the angle range corresponding to the face up state to within the angle range corresponding to the face down state.

When the tilting state is confirmed to be changed from the face up state to the face down state, then in a step S540, the handheld communication device is controlled to perform a function such as entering a mute mode Otherwise, the handheld communication device continues to detect the tilting state of the handheld communication device and determine whether the tilting state is changed from the face up state to the face down state.

Based on the above, a user may switch the handheld communication device into the mute mode through simply flipping the handheld communication device, which is convenient and intuitive. Moreover, when the handheld communication device terminates the notice, it may keep staying in the mute mode so as to prevent from bothering, or the handheld communication device may automatically resume back to a normal mode so that the user may be notified by a sound notice, a ringtone notice, and/or a vibration notice when the handheld communication device activates a next notice. Certainly, the user may also switch the handheld communication device back to the normal mode by flipping the handheld communication device again to leave the face down state, by selecting a menu, or by any other means. It is noted that the notice comprises a sound notice, a ringtone notice, and a vibration notice, wherein the sound of the handheld communication device is turned on in the normal mode and turned off in the mute mode, the ringtone of the handheld communication device is turned on in the normal mode and turned off in the mute mode, and the vibration function of the handheld communication device is turned on in the normal mode and is turned off in the mute mode.

It should be emphasized herein that, in one embodiment, the handheld communication device may detect the tilting state of the handheld communication device at a fixed interval, which is between 50 and 200 milliseconds. If the detected tilting state is changed from the face up state to the face down state and continuously stays in the face down state for more than a period of time, then the number of times that the tilting state is in the face down state is accumulated and used to confirm that the tilting state is changed from the face up state to the face down state.

Figure 6:
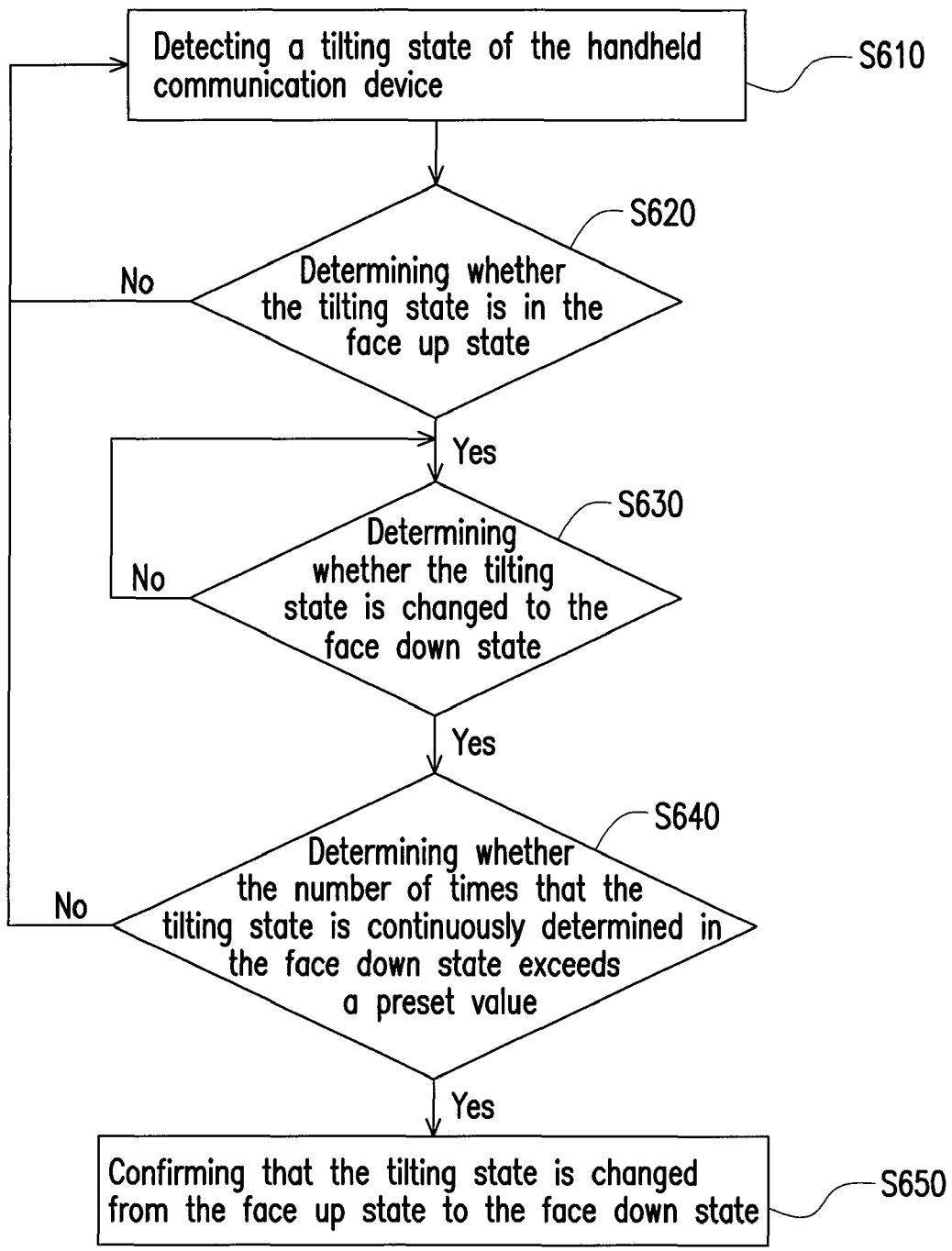
FIG. 6 is a flowchart illustrating a method for determining whether the tilting state of the handheld communication device is changed from the face up state to the face down state according to one embodiment of the present application.

FIG. 6 is a flowchart illustrating a method for determining whether the tilting state of the handheld communication device is changed from the face up state to the face down state according to one embodiment of the present application. Referring to FIG. 6, the handheld communication device determines the state transition between the face up state and the face down state according the order and the number of times that the handheld communication device stays in the face up state and the face down state. The steps of the present embodiment are as follows:

First, in a step S610, a G-sensor disposed in the handheld communication device is used for detecting the tilting state of the handheld communication device, in which a tiling angle and a rolling angle are calculated and compared with a plurality of angle ranges corresponding to a plurality of tilting states, so as to determine the current tilting state.

In a step S620, it is determined whether the tilting state is in the face up state. It can be determined that the tilting state is in the face up state if the calculated tiling angle and a rolling angle are within the angle ranges corresponding to the face up state, in which the angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree.

If the tilting state of the handheld communication device is determine to be in the face up state, then, in a step S630, the handheld communication device continues to determine whether the tilting state is changed to the face down state. Similarly, the calculated tiling angle and a rolling angle are continuously compared with the angle ranges corresponding to all tilting states and it can be determined that the tilting state is changed to the face down state if the tiling angle and a rolling angle are determined to be within the angle ranges corresponding to the face down state, in which the angle range of the tiling angle corresponding to the face down state is from 170 degree to 190 degree and the angle range of the rolling angle corresponding to the face down state is from 170 degree to 190 degree.

It should be noted herein that, in the process of changing from the face up state to the face down state, the handheld communication device may pass through other tilting states, such as landscape left state, landscape right state, portrait top state, or portrait bottom state. However, the present embodiment does not limit the number or the type of tilting states that the handheld communication device has passed through. The key point is whether the handheld communication device stays in the face up state first and changed to the face down state in the end.

If the tilting state of the handheld communication device is determined to be changed to the face down state, then in a step S640, the handheld communication device determines whether a number of times that the tilting state is continuously determined in the face down state exceeds a preset value.

Whenever the number of times that the tilting state is continuously determined in the face down state exceeds the preset value, then, in a step S650, it is confirmed that the tilting state is changed from the face up state to the face down state. However, if the tilting state is changed from the face down state to the tilting state other than the face down state before the number of times exceeds the preset value, then the foregoing determined state transition is considered as a fake posture and whether the tilting state is changed from the face up state to the face down state has to be re-determined.

In detail, due to the unstability of the G-sensor, some deviations or noises may occur in the detecting result and the external forces like vibration of the device may increase those "errors". Therefore, in order to guarantee that the detected state transition, that is, from the face up state to the face down state, is a correct posture without being affected by the errors, in the situations that the tilting state is changed from the face down state to the face up state or other tilting state before the number of times in the face down state exceeds the preset value, the state transition will be considered as a fake posture, such that the determination process of the state transition has to be repeated again. Examples in respect of this issue are given below.

Figure 7:
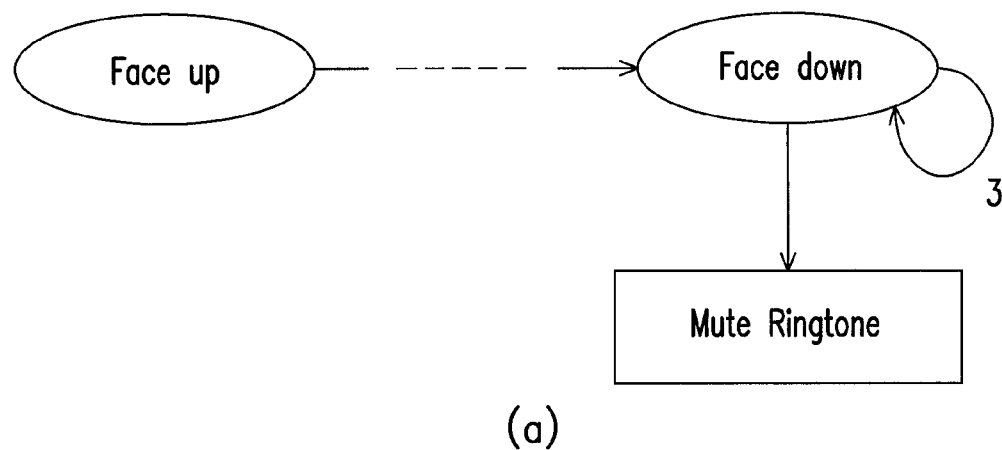
FIG. 7(a)~7(d) are schematic diagrams illustrating examples of determining whether the tilting state of the handheld communication device is changed from the face up state to the face down state according to one embodiment of the present application.
Figure 7:
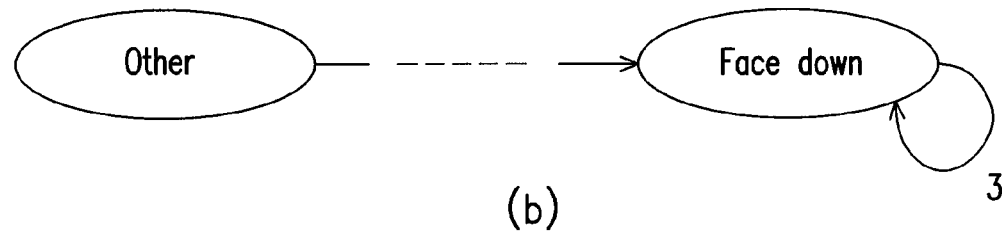
Figure 7:
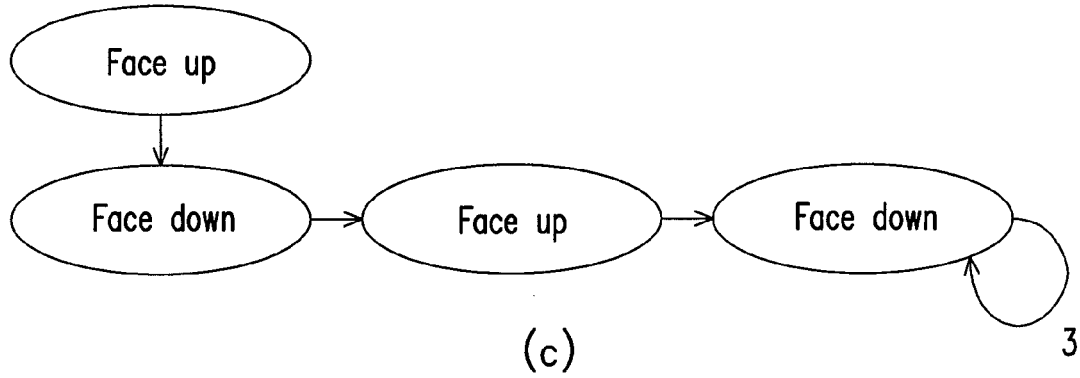
Figure 7:
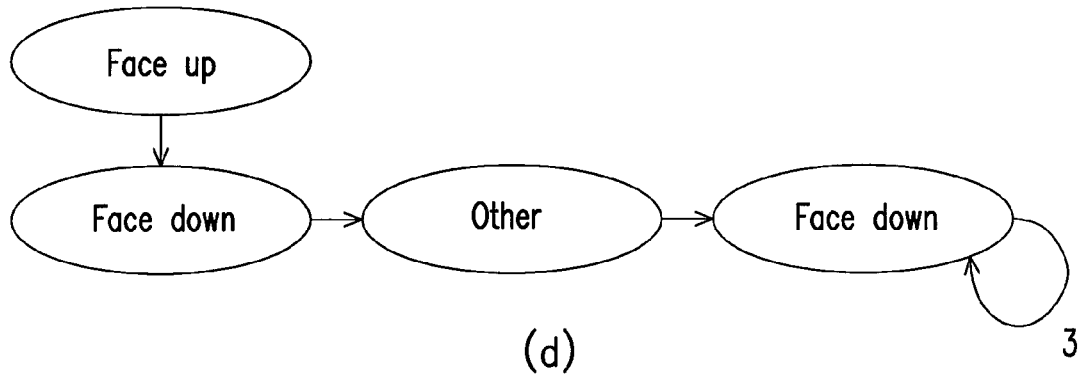

FIG. 7(a)~7(d) are schematic diagrams illustrating examples of determining whether the tilting state of the handheld communication device is changed from the face up state to the face down state according to one embodiment of the present application. Referring to FIG. 7(a), it indicates that if the tilting state starts from the face up state, ends at the face down state, and then stays in the face down state for more than three times (accumulated once at a 50-200 milliseconds interval), no matter how many titling states or what kinds of titling states that have been passed through, it always comes out with a correct posture, such that the handheld communication device is controlled to enter a mute mode, in which the ringtone of the handheld communication device is muted.

Referring to FIG. 7(b), it indicates that if the tilting state starts from a tilting state other than the face up state, ends at the face down state, and then stays in the face down state for more than three times, it results in a fake posture because the face up state is a requirement to trigger the controlling method of the present application.

Referring to FIG. 7(c), it indicates that if the tilting state starts from the face up state, passes through the face down state, face up state, and then returns to the face down state, it results in a correct posture because the face up state is occurred before the number of times staying in the face down state is accumulated to three times.

Similarly, referring to FIG. 7(d), it indicates that if the tilting state starts from the face up state, and passes through the face down state, the tilting state other than the face up state and face down state, and then returns to the face down state, it results in a fake posture because the another state is occurred before the number of times staying in the face down state is accumulated to three times.

Figure 8:
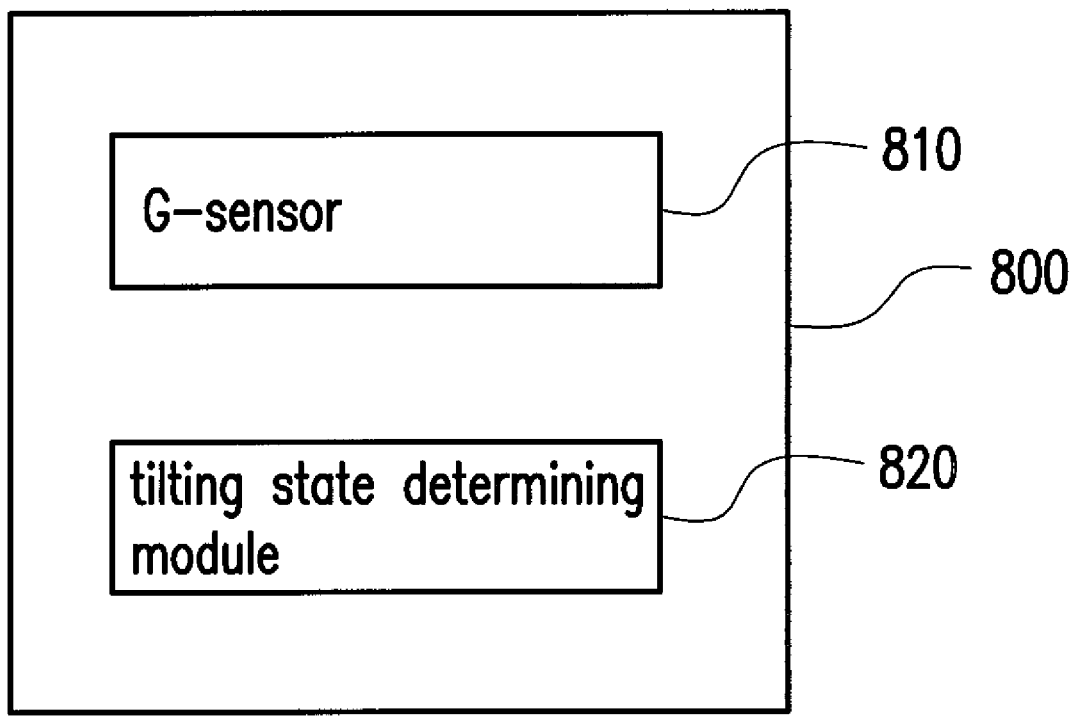
FIG. 8 is a block diagram illustrating a controlling system according to one embodiment of the present application.

The present application further provides a controlling system, which is installed in a handheld communication device so as to perform a function of the handheld communication device. FIG. 8 is a block diagram illustrating a controlling system according to one embodiment of the present application. Referring to FIG. 8, the controlling system 800 comprises a G-sensor 810 and a tilting state determining module 820. The G-sensor 810 is used for detecting a tilting state of a handheld communication device. The tilting state determining module 820 is used for determining whether the tilting state is changed from a face up state to a face down state. When the tilting state is confirmed to be changed from the face up state to the face down state, the tilting state determining module 820 controls the handheld communication device to perform a function such as entering a mute mode.

The G-sensor 810 detects a normal vector of a plane of the handheld communication device and calculates a tiling angle that the plane is rotated along a transverse coordinate axis (X axis) and a rolling angle that the plane is rotated along a vertical coordinate axis (Y axis) according to the detected normal vector. Then, the G-sensor 810 further compares the tiling angle and the rolling angle with a plurality of angle ranges corresponding to a plurality of tilting states to determine the current tilting state of the handheld communication device. The angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree, and the angle range of the tiling angle corresponding to the face down state is from 170 degree to 190 degree and the angle range of the rolling angle corresponding to the face down state is from 170 degree to 190 degree.

It should be noted herein that the G-sensor 810 detects the tilting state of the handheld communication device at a fixed interval. Accordingly, the tilting state determining module 820 first determines whether the tilting state is in the face up state and continues to determine whether the tilting state is changed to the face down state when the tilting state is determined in the face up state. The tilting state determining module 820 also determines whether a number of times that the tilting state is continuously determined in the face down state exceeds a preset value when the tilting state is determined to be changed to the face down state. Finally, the tilting state determining module 820 confirms that the tilting state is changed from the face up state to the face down state when the number of times exceeds the preset value.

The present application further provides a recording medium (for example, a CD, a DVD, a floppy disk, a memory card, a hard disk, or a removable hard disk, etc), and the recording medium records a computer-readable permission approval program for executing foregoing controlling method. Herein the permission approval program recorded in the recording medium is usually composed of a plurality of code snippets (for example, a code snippet for establishing an organization chart, a code snippet for approving a form, a configuration code snippet, and a deployment code snippet), and the functions of these code snippets are corresponding to the steps of the controlling method.

In summary, in the present application, according to the angle in which the handheld communication device is placed, the controlling method for the handheld communication device determines whether the handheld communication device should perform a function. When the front plane of the handheld communication device is placed from a upward direction to a downward direction, it is determined that the user does not want to pick up the phone temporarily, so that the device is controlled to perform a function such as entering a mute mode to prevent from bothering. Thereby, a more intuitive and convenient way to control the handheld communication device.

Although the present application has been described with reference to the above embodiments, it will be apparent to one of the ordinary skill in the art that modifications to the described embodiment may be made without departing from the spirit of the application. Accordingly, the scope of the application will be defined by the attached claims not by the above detailed description.

What is claimed is:

1. A controlling method for a handheld communication device, comprising:
    detecting a tilting state of the handheld communication device at a fixed interval by using a G-sensor;
    determining whether the tilting state is changed from a face up state to a face down state, the method of determining comprising:
    determining whether the tilting state is in the face up state;
    continuing to determine whether the tilting state is changed to the face down state when the tilting state is determined in the face up state;
    determining whether a number of times that the tilting state is continuously determined in the face down state exceeds a preset value when the tilting state is determined to be changed to the face down state; and confirming that the tilting state is changed from the face up state to the face down state when the number of times exceeds the preset value; and controlling the handheld communication device to perform a function when the tilting state is confirmed to be changed from the face up state to the face down state.

2. The controlling method according to claim 1, wherein the step of detecting the tilting state of the handheld communication device comprises detecting the tilting state of the handheld communication device when a notice is activated.

3. The controlling method according to claim 2, wherein the step of controlling the handheld communication device to perform the function comprises controlling the handheld communication device to enter a mute mode when the tilting state is confirmed to be changed from the face up state to the face down state.

4. The controlling method according to claim 2, wherein the notice comprises:
   a sound notice, and wherein a sound of the handheld communication device is turned on in the normal mode and turned off in the mute mode;
   a ringtone notice, and wherein a ringtone of the handheld communication device is turned on in the normal mode and turned off in the mute mode; or
   a vibration notice, and wherein a vibration function of the handheld communication device is turned on in the normal mode and is turned off in the mute mode.

5. The controlling method according to claim 1, wherein a length of the fixed interval is between 50 and 200 milliseconds.

6. The controlling method according to claim 1, wherein in the step of determining whether the number of times that the tilting state is continuously determined in the face down state exceeds the preset value, if the number of times has not exceeded the preset value and the tilting state is changed from the face down state to the tilting state other than the face down state, whether the tilting state is changed from the face up state to the face down state is re-determined.

7. The controlling method according to claim 1, wherein the step of detecting the tilting state of the handheld communication device by using the G-sensor comprises:
   detecting a normal vector of a plane of the handheld communication device;
   calculating a tiling angle that the plane is rotated along a transverse coordinate axis (X axis) and a rolling angle that the plane is rotated along a vertical coordinate axis (Y axis) according to the detected normal vector; and
   comparing the tiling angle and the rolling angle with a plurality of angle ranges corresponding to a plurality of tilting states to determine the current tilting state of the handheld communication device.

8. The controlling method according to claim 7, wherein the angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree; and
the angle range of the tiling angle corresponding to the face down state is from 170 degree to 190 degree and the angle range of the rolling angle corresponding to the face down state is from 170 degree to 190 degree.

9. The controlling method according to claim 7, wherein the plane of the handheld communication device is the plane comprising a screen of the handheld communication device.

10. The controlling method according to claim 1, wherein the tilting state comprises landscape left state, landscape right state, portrait top state, portrait bottom state, face up state, and face down state.

11. A recording medium, for recording a computer program, wherein the computer program comprises a plurality of program codes, and the computer program is suitable for being loaded into a handheld communication device to enable the handheld communication device to execute the controlling method as claimed in claim 1.

12. A controlling system, comprising:
   a G-sensor for detecting a tilting state of a handheld communication device at a fixed interval; and
   a tilting state determining module for determining whether the tilting state is changed from a face up state to a face down state by determining whether the tilting state is in the face up state, continuing to determine whether the tilting state is changed to the face down state when the tilting state is determined in the face up state, determining whether a number of times that the tilting state is continuously determined in the face down state exceeds a preset value when the tilting state is determined to be changed to the face down state, and confirming that the tilting state is changed from the face up state to the face down state when the number of times exceeds the preset value and controlling the handheld communication device to perform a function when the tilting state is confirmed to be changed from the face up state to the face down state.

13. The controlling system according to claim 12, wherein the G-sensor detects the tilting state of the handheld communication device when a notice is activated, and the tilting state determining module controls the handheld communication device to enter a mute mode when the tilting state is confirmed to be changed from the face up state to the face down state.

14. The controlling system according to claim 12, wherein the G-sensor comprises detecting a normal vector of a plane of the handheld communication device, calculating a tiling angle that the plane is rotated along a transverse coordinate axis (X axis) and a rolling angle that the plane is rotated along a vertical coordinate axis (Y axis) according to the detected normal vector, and comparing the tiling angle and the rolling angle with a plurality of angle ranges corresponding to a plurality of tilting states to determine the current tilting state of the handheld communication device, wherein the angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree, and the angle range of the tiling angle corresponding to the face down state is from 170 degree to 190 degree and the angle range of the rolling angle corresponding to the face down state is from 170 degree to 190 degree.

* * * * *